Patented Jan. 5, 1943

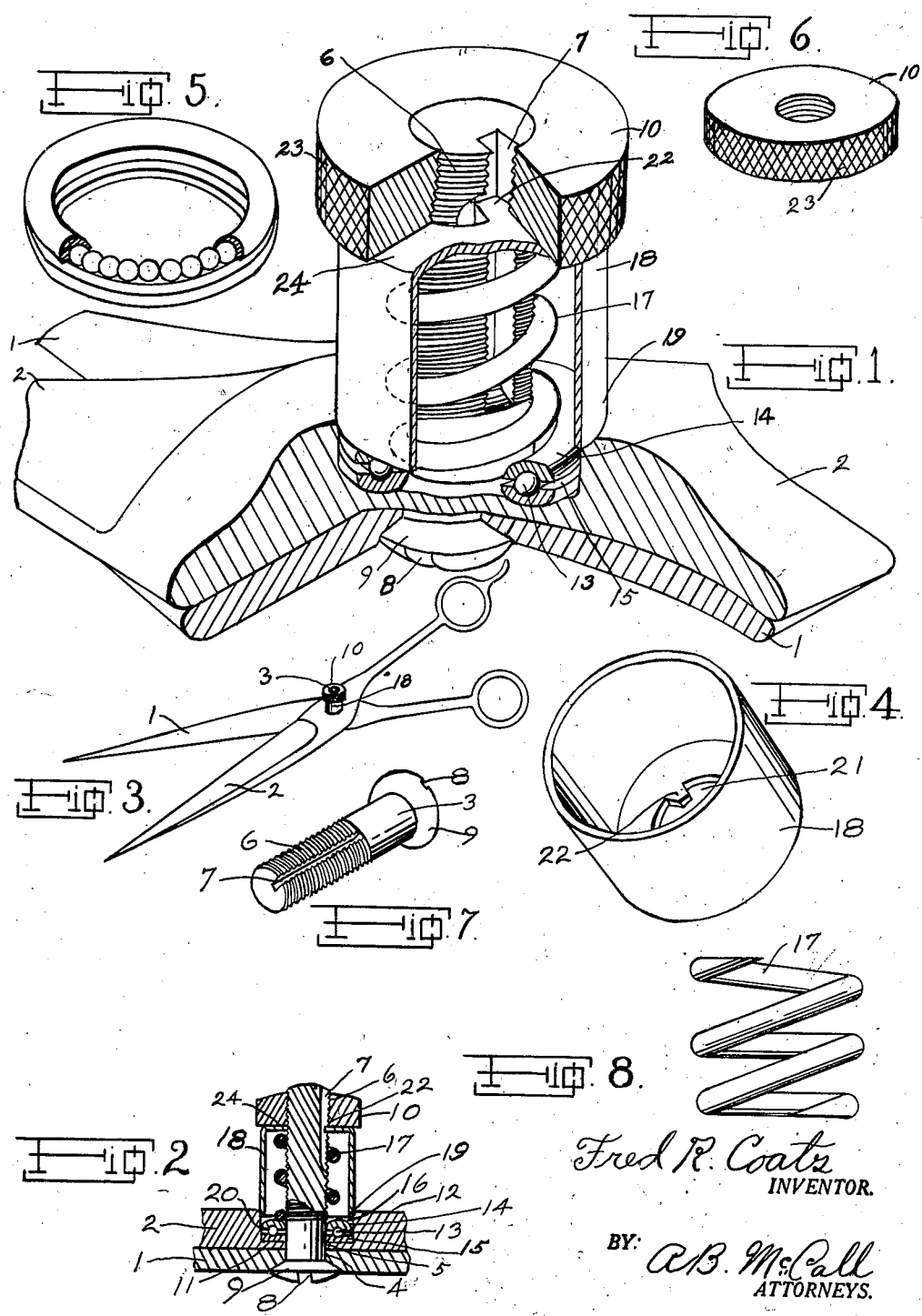

2,307,489

UNITED STATES PATENT OFFICE 2,307,489

BALL BEARING SHEARS

Fred R. Coats, Springfield, Ill.

Application May 13, 1941, Serial No. 393,181

4 Claims. (Cl. 30—266)

My invention relates to shears and especially to ball bearing shears; an object being in my device to provide an economical and practical improvement in ball bearing shears and an improvement which renders the operation of the shears wholly dependable at all times when used.

A particular purpose of my invention is to provide a ball bearing shear which may not only be adjusted for the desired operating tension between the cutting blades, but one which will hold these blades to the selected cutting tension until it is desired to again adjust them and without working loose under daily use.

I attain the objects of my invention by the device described in this specification, recited in the claims, and illustrated in the accompanying drawing, wherein like reference numerals indicate like parts in the several figures:

Referring to the drawing:

Fig. 1 is a perspective of my improvements in ball bearing shears.

Fig. 2 is a vertical half section of my device shown in Fig. 1.

Fig. 3 is a perspective of a pair of barber shears utilizing my improvements.

Fig. 4 is a perspective of the inner side of the dust cap used with my adjustable ball bearing.

Fig. 5 is a perspective showing in cut-away the ball bearing utilized in my improvements in shears.

Fig. 6 is a perspective showing the adjustment screw of my invention. It is this thumb screw that is used for making the adjustment in the tension between the cutting blades of the shears.

Fig. 7 is a perspective of the screw bolt about which the blades of the shears are pivoted and about which the adjustable ball bearing shear tension is operatively adjusted.

Fig. 8 is a side view of the coiled spring utilized in my ball bearing shear improvement.

Referring now to the salient features of my invention, the details of construction thereof and the preferred manner of operating the same, I provide in a pair of shears suitable for any one of a number of uses, a pivotal connection for cutting blades 1 and 2. The central axis for the shear blades 1 and 2 to move about, is provided in a screw bolt 3 (see Fig. 7). This screw bolt extends up through bearing apertures 4 in blades 1 and 5 in blade 2 as the pivotal connection for both.

This screw bolt 3 has terminal threads 6 and a longitudinal channel or slot 7 running out to its top end while a head slot 8 on head 9 of the screw bolt may be utilized for holding the bolt steady while adjustments are being made in the thumb screw 10 at the top end of the screw bolt 3.

It will be noted that the top blade 2 not only has its bolt hole or aperture 5 just large enough to snugly accommodate screw bolt 3 extending therethrough, but this central opening in the top surface of blade 2 is also shaped to define a supporting shoulder 11 deeply set below the top surface 12 of blade 2, for the operative support of the ball bearing used in my invention and defined by balls 13, by ball race 14, and ball race 15, which detachably rests upon shoulder 11 of the enlarged portion 16 of aperture 5 through which the screw bolt 3 extends.

After this screw bolt is set into position, extending through the aligned apertures 4 and 5 preferably with head 9 somewhat counter-sunk in its fitting position up into aperture 4 in blade 1, then the ball bearings are set in place on shoulder 11 encompassing screw bolt 3, after which coiled spring member 17 is slipped over the end of screw bolt 3 to rest upon ball race 14 of the ball bearing.

After this spring 17 is placed in position, about screw bolt 3, then dust cap 18 extends, with its lower end 19, down over the ball bearing, with a diameter preferably just large enough to let this lower end 19 snugly move slightly down into the peripheral wall 20 about shoulder 11 holding the ball bearing.

This dust cap 18 may normally rest with its lower end 19 somewhat above the level of the top surface 12 of blade 2, but when adjustments may be needed, in the tension of the cutting blades 1 and 2, then it may be desired to let this lower end 19 move down into the annular walls 20 supporting the ball bearing.

It will be noted that as a novel feature of my invention, I have not only made dust cap 18 to be easily placed in position to protect the ball bearing and spring 17 by permitting the top end of screw bolt 3 to extend up through hole 21 in dust cap 18 but I have provided in this dust cap, a tongue 22 registering within longitudinal slot 7 of screw bolt 3 in position to slidably move in this slot but to prevent dust cap 18 from rotating about screw bolt 3.

It will thus be observed that when thumb screw 10 with its preferably knurled outer surface 23 is turned down on threads 6 of screw bolt 3, while resting upon the top surface 24, the result is, by this screw adjustment, to develop a compression down against spring 17. As adjustment screw 10 is thus turned down on thread 6, while it presses upon dust cap 18, pushing down on spring 17, the tendency will be to increase the cutting tension between blades 1 and 2 and while these adjustments are being made with adjustment screw 10 sliding about the top surface 24 of dust cap 18, there is no chance for the dust cap to rotate with adjustment screw 10 because tongue member 20 will not permit this rotation since it snugly registers slidably but not rotatably in channel 7.

As a result of this construction, it will be seen that any desired tension may be made between the cutting blades 1 and 2 at will and tongue member 22 of dust cap 18 will hold this tension where it has been selected.

The normal movement of the shears when in use may thus be accomplished without any chance for the adjustment screw 10 to be loosened inadvertently.

It will be noted that with this construction, the same principle of operation for my adjustable ball bearing for shears will be just as effective when used in one type of shear as it is another, whether it be for barber shears, ordinary cloth cutting shears, physicians' operating shears, or tinners' snips. The effective result will be the same in any case.

Having thus described the nature of my invention, what I claim is:

1. A ball bearing shear comprising in combination a pair of shear blades a pivot bolt encompassed by a spring and a ball bearing support therefor operatively arranged and shaped to define means for easing the cutting tension between the blades a dust cap having a central tongue, and resting upon said ball bearing, said bolt having a longitudinal slot for the dust cap tongue and means for holding the adjusted tension.

2. In a ball bearing shear, the combination with a pair of pivoted shear blades of a slotted screw bolt axis, a ball bearing, a coiled spring, a dust cap having a tongue slidable but not rotatable in said screw bolt slot, and an adjustment screw for selectively varying the cutting tension between said blades.

3. In a ball bearing shear, the combination with a pair of shear blades and handles pivotally connected of a threaded and slotted screw bolt shaped to define an axis for said pivotal connection and each of said blades provided with a bearing aperture operatively encompassing said screw bolt, one of said bearing apertures shaped to define an annular shoulder and a ball bearing race and balls supported thereon, a coil spring encompassing said screw bolt as it is supported on said bearing, a dust cap having an integral tongue slidably registering in said slot of the screw bolt and said cap resiliently supported on said spring, a threaded adjustment screw meshing with said threads of the screw bolt and the head of said screw bolt shaped to define means for holding it while adjustments are being made in said adjustment screw for tightening or loosening the tension between said shear blades.

4. An improved ball bearing shear, comprising in combination, a pair of shear blades and handles, having screw holes in pivotal alignment, each respectively, a screw bolt extending up through said holes to define an axis for the pivotal movement of said blades when the shears are used, said hole in the top blade shaped to define an annular shoulder deeply registering therein; a ball race and ball bearing disposed on said annular shoulder in said screw hole of the top blade, said screw bolt provided with terminal threads and a longitudinal slot extending to its threaded terminal, a coiled spring encompassing said screw bolt and supported upon said ball bearing; a dust cap having an integral tongue slidably registering within said slot of the bolt, and resiliently supported by said coiled spring, a threaded adjustment screw on said threads of the bolt over said cap, said dust cap operatively registering over said spring and bearings and adapted to adjustably move down inside the walls of said top screw hole over said bearing, and said bolt having a head shaped to define means for holding the same still while moving said adjustment screw.

FRED R. COATS.